(12) United States Patent
Finas

(10) Patent No.: US 10,315,675 B2
(45) Date of Patent: Jun. 11, 2019

(54) MODULAR CARRIAGE FOR RECORDING MAGNETIC TERRAIN DATA IN PARTICULAR FOR THE NON-INVASIVE INSPECTION OF PIPELINES OR THE SAME

(71) Applicant: SKIPPER NDT, Dublin (IE)

(72) Inventor: Mathieu Finas, Paris (FR)

(73) Assignee: SKIPPER NDT (IE)

( * ) Notice: Subject to any disclaimer, the term of this patent is extended or adjusted under 35 U.S.C. 154(b) by 17 days.

(21) Appl. No.: 15/765,071

(22) PCT Filed: Oct. 6, 2016

(86) PCT No.: PCT/IB2016/055987
§ 371 (c)(1),
(2) Date: Mar. 30, 2018

(87) PCT Pub. No.: WO2017/060846
PCT Pub. Date: Apr. 13, 2017

(65) Prior Publication Data
US 2018/0281835 A1    Oct. 4, 2018

(30) Foreign Application Priority Data
Oct. 9, 2015 (FR) ...................... 15 59634

(51) Int. Cl.
*B62B 1/18* (2006.01)
*F17D 5/06* (2006.01)
*B62B 5/06* (2006.01)

(52) U.S. Cl.
CPC ................. *B62B 1/18* (2013.01); *B62B 5/06* (2013.01); *F17D 5/06* (2013.01); *B62B 2202/48* (2013.01); *B62B 2501/06* (2013.01)

(58) Field of Classification Search
CPC ......... B62B 1/18; B62B 5/06; B62B 2202/48; B62B 2501/06; F17D 5/06
(Continued)

(56) References Cited

U.S. PATENT DOCUMENTS 3,920,259 A * 11/1975 Graham ................. B62B 3/008
280/47.34

FOREIGN PATENT DOCUMENTS

CA    1 161 115 A     1/1984
DE    25 30 589 A1    1/1977
(Continued)

OTHER PUBLICATIONS

International Search Report dated Dec. 1, 2016 in corresponding PCT International Application No. PCT/IB2016/055987.
(Continued)

*Primary Examiner* — Paul N Dickson
*Assistant Examiner* — Hilary L Johns
(74) *Attorney, Agent, or Firm* — Ostrolenk Faber LLP

(57) ABSTRACT

A modular carriage for recording magnetic terrain data, notably for the non-invasive inspection of pipelines, electric cables or the like. The carriage includes an articulated chassis mounted on wheels including means for accommodating a device for recording the magnetic field coupled to sensors, a rear frame allowing the carriage to be handled by an operator, at least two positioning bars equipped with housings for securing the sensors along a first and a second axis respectively, the positioning bars forming a detection plane P substantially perpendicular to the direction of travel of the carriage.

10 Claims, 2 Drawing Sheets

(58) Field of Classification Search
USPC .................................................. 280/47.24
See application file for complete search history.

(56) References Cited

FOREIGN PATENT DOCUMENTS

| DE | 10 2006 028 421 | A1 | | 12/2007 | | |
|----|---|---|---|---|---|---|
| EP | 1 074 674 | A2 | | 2/2001 | | |
| EP | 1074674 | A2 | * | 2/2001 | ............. | E04D 15/04 |

OTHER PUBLICATIONS

Written Opinion dated Dec. 1, 2016 in corresponding PCT International Application No. PCT/IB2016/055987.

* cited by examiner

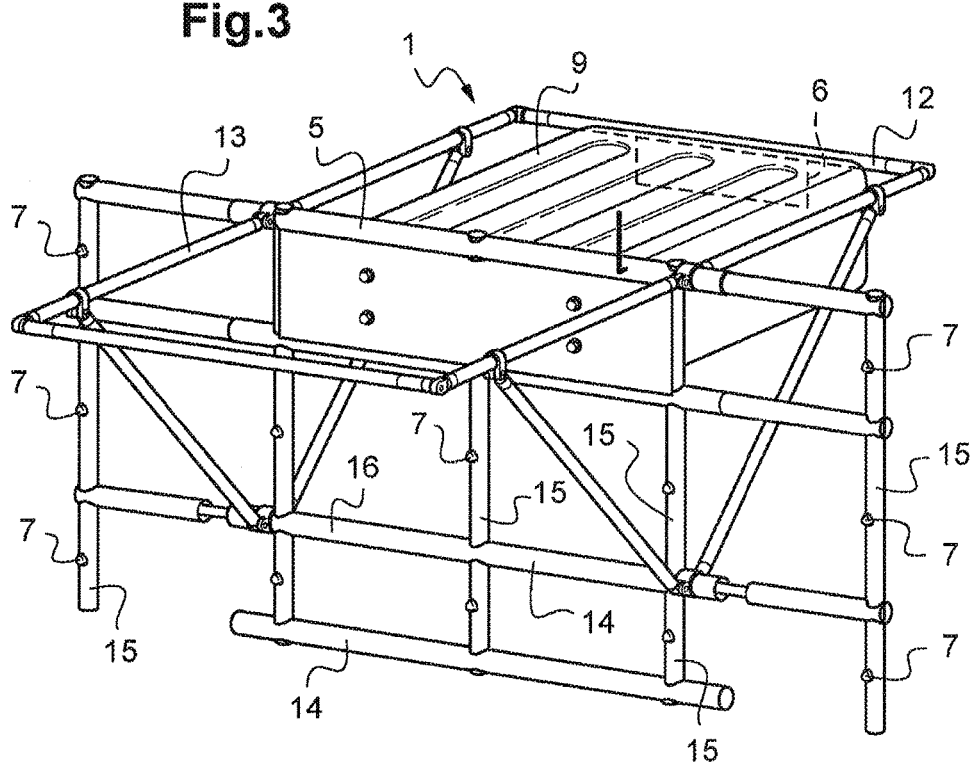

MODULAR CARRIAGE FOR RECORDING MAGNETIC TERRAIN DATA IN PARTICULAR FOR THE NON-INVASIVE INSPECTION OF PIPELINES OR THE SAME

CROSS-REFERENCE TO RELATED APPLICATIONS

The present application is a 35 U.S.C. §§ 371 national phase conversion of PCT/IB2016/055987, filed Oct. 6, 2016, which claims priority to French Patent Application No. 15/59634, filed Oct. 9, 2015, the contents of which are incorporated herein by reference. The PCT International Application was published in the French language.

TECHNICAL FIELD

The present invention concerns a modular carriage for recording magnetic terrain data in particular for the non-invasive inspection of pipelines, buried or aerial metallic structures, electrical cables or the same.

The invention is mainly applied for a carriage allowing to follow the routing of the pipelines or gas pipes or petroleum liquids on natural terrains in order to monitor the state of the pipe and to detect possible deteriorations or leakages.

However, this application is not restrictive and the carriage can also be used on other types of pipes and for example water pipes, and on other types of terrains and in particular on urban or artificial terrains.

PRIOR ART

Considering both the risks of accidents and the normative conditions, the pipeline operators must regularly check the state of their network. For this purpose, two main methods are known, namely a verification from the inside of the pipe or an external verification.

The verification from the inside is generally performed by a robot being able, for some of them, to check and even repair the surface of the pipe. This type of internal inspection is advantageous, however, the robots are not suitable for all the types of pipes in particular those having restricted diameters, narrowings, internal surfaces that are very irregular or that receive valves, or very large bent sections.

The verification from the outside is performed by following in surface the routing of the pipe using a device provided with sensors and by searching for anomalies representative of a poor state or a deterioration of the pipe. Different types of sensors can be used for this non-destructive analysis and in particular magnetometers in order to record the magnetic field near the pipeline, preferably in line therewith. This technique by passive magnetic detection, based on the Villari effect, is very satisfactory under the condition of being able to perform accurate surveys or recordings.

So far, these surveys are performed by an operator moving with a harness or a backpack allowing the transportation of both the detection system with the sensors, the geolocation system and the supply of the whole. If this harness system allows the operator to move on difficult terrains, it has the disadvantage of making inaccurate, or even false, the measurements of the magnetometers. This inaccuracy is due in particular to the close positioning of the sensors together, to the difficulty of keeping them in the same plane of displacement given the movements of the harness relative to the user and the displacement of the user himself.

The measurement of the magnetometers is also modified by the presence on the operator of elements modifying the magnetic field and in particular electrical and electronic objects such as the power supply and the localization system.

The present invention is in the field of the monitoring of pipelines or the same and represents an advantageous alternative solution to harness devices designed for the transportation of apparatuses for measuring and monitoring in a non-destructive manner the pipelines from the outside and particularly by the passive or active magnetic monitoring technique, that is to say with a magnetic wave transmission in the pipeline.

OBJECT OF THE INVENTION

A first aim of the present invention is to solve all or part of the technical problems related to the aforementioned prior art.

Another aim of the present invention is to provide a modular carriage allowing the displacement of the measuring elements on different terrains by rolling or carrying.

Another aim of the present invention is to provide a modular carriage wherein the sensors allowing the recording are positioned and oriented in an accurate and stable manner.

Another aim of the present invention is to provide a modular carriage wherein the measurement of the sensors is not modified by the electrical and/or electronic objects disposed on the operator or by the structural elements of the carriage.

SUMMARY OF THE INVENTION

The invention aims to protect a modular carriage for the recording of magnetic terrain data, in particular for the non-invasive inspection of pipelines or the like. According to the invention, said carriage comprises a hinged chassis mounted on wheels comprising:
  means for receiving a device for recording the magnetic field coupled to sensors,
  a rear frame allowing the manipulation of the carriage by an operator,
  at least two positioning bars equipped with housings for securing the sensors according to a first and a second axis respectively, the positioning bars forming
a detection plane P substantially perpendicular to the direction of displacement of the carriage.

BRIEF DESCRIPTION OF THE FIGURES

The present invention will be better understood upon reading a detailed exemplary embodiment with reference to the appended figures, provided by way of non-limiting example, among which:

FIG. 3 shows the exemplary embodiment of FIG. 1 in a second configuration called double carrying configuration.

DETAILED DESCRIPTION OF THE INVENTION

Figure 1:
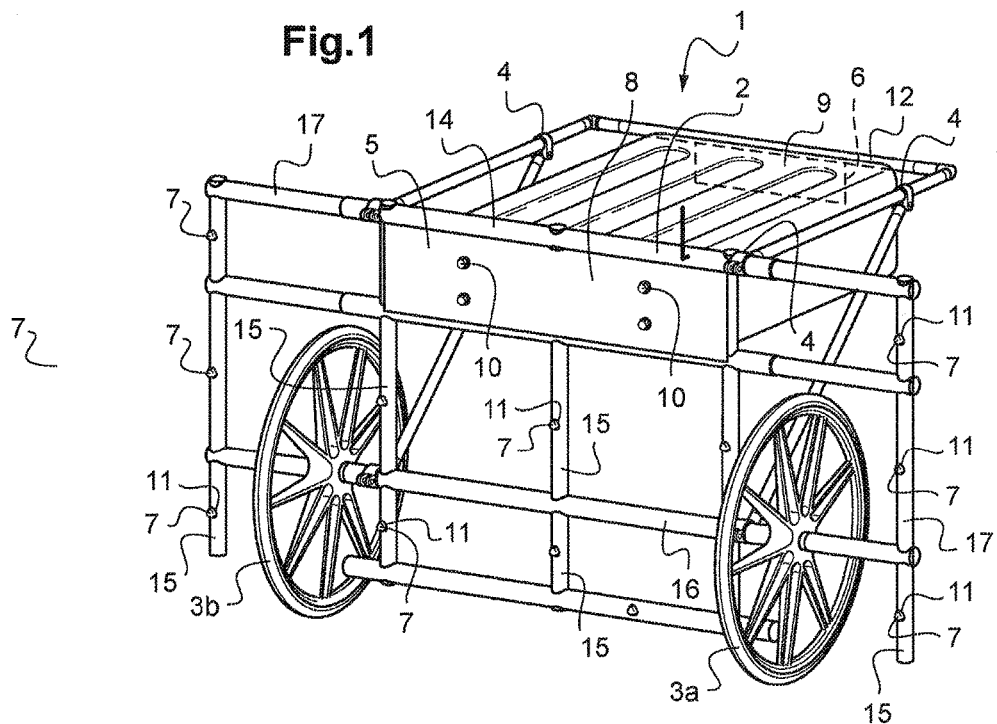
FIG. 1 shows a schematic exemplary embodiment of a device in accordance with the invention, in a perspective view, according to a first configuration called rolling configuration.

The present invention aims to protect a modular carriage. Referring mainly to FIG. 1, in schematic form, an exemplary embodiment of this modular carriage 1 is shown in its so-called rolling configuration, that is to say a carriage 1 in which the chassis 2 includes two wheels 3a and 3b.

Figure 2:
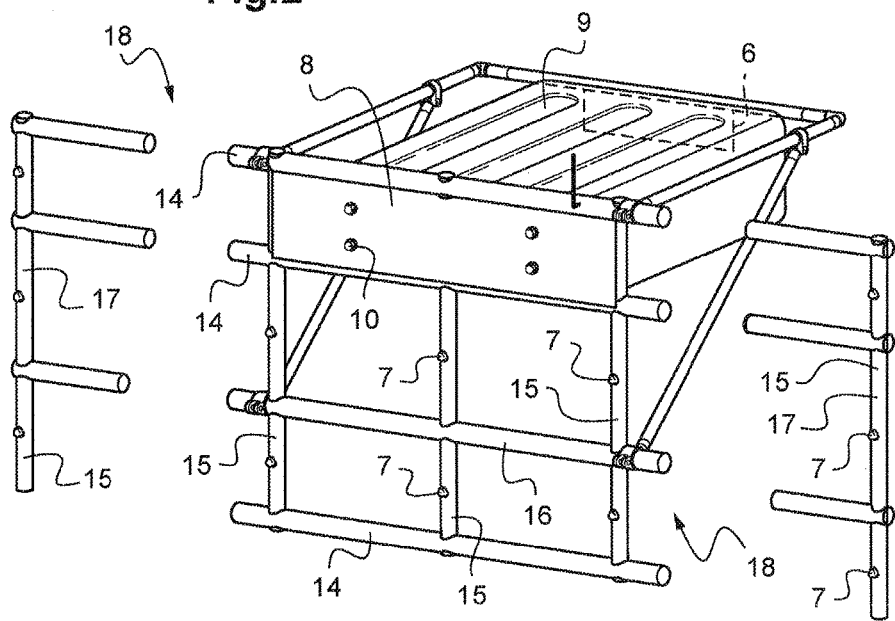
FIG. 2 shows the exemplary embodiment of FIG. 1 in a second configuration called carrying configuration.

Referring to FIG. 2, this same modular carriage 1 whose wheels 3a and 3b have been removed is shown corresponding to the simple carrying configuration.

Finally, referring to FIG. 3, this same modular carriage 1 whose wheels 3a and 3b have also been removed is shown but in the double carrying configuration.

Other configurations are also possible and in particular a double carrying configuration, wherein the wheels 3a and 3b are maintained fastened to the chassis 2.

The choice of the configuration is made according to the nature of the terrain on which the inspection is made and to the number of available operators, the switching from one configuration to another being quick and reliable.

For example, the rolling configuration is promoted when the terrain is relatively flat and the carrying sections are short.

The simple carrying configuration is particularly adapted to non-planar and relatively short terrains or when a second operator is not available, for example when the latter conducts upstream researches to determine the position of the pipeline.

The double carrying configuration is particularly suitable when the inspection is performed on a non-planar clear terrain. When the inspection alternates between non-planar and planar sections, a double carrying configuration with wheels 3a and 3b is provided allowing to relieve the operators.

Referring again to FIG. 1, the chassis 2 is shown hinged and mounted on wheels.

The hinge means or hinges 4 allow bending the different elements of the chassis 2 on one another which allows reducing the bulk of the carriage 1 in particular during its storage.

In the exemplary embodiment of the appended Figures, the carriage 1 includes removable wheels 3a and 3b, however in one variant, a chassis 2 equipped with fixed wheels is chosen for simplifying the construction.

The chassis 2 further comprises means 5 for receiving a recording device 6 of the magnetic field coupled to sensors 7.

These receiving means 5 allow fastening to a support plate 8, by means of advantageously non-metallic and in particular plastic screws, a box 9 grouping the recording device 6 including the analysis means, a display and/or a human-machine interface, a GPS-type positioning system, coupled with an inertial unit, a Wi-Fi type wireless connection.

Advantageously, in order to limit the weight and the interferences, different elements placed in the box 9 and in particular the power supply means are remote and in particular can be housed in a backpack carried by an operator.

The receiving means 5 also include housings 11 distributed on the chassis 2 at determined points and allowing to receive the sensors 7.

For example, the housings 11 are tapped so as to fasten the sensors 7 by screwing them into the housings 11, the sensors 7 being for this purpose mounted on threaded bushings. In this way, the sensors 7, such as magnetometers, are accurately oriented and fixed relative to each other.

Referring indifferently to FIGS. 1 to 3, the chassis comprises a rear frame 12. This rear frame 12 allows the manipulation of the carriage 1 by an operator placed behind the latter, either by allowing to push the latter or by constituting a hold to lift the carriage 1.

Referring now to FIG. 3, the carriage 1 is also equipped with a front frame 13 in the double carrying configuration. This front frame 13 allows a second operator to hold the carriage 1 so that the latter can be lifted like a stretcher. In case of rolling (once the wheels are positioned), it also enables, depending on the position of the operator, pulling or pushing the carriage 1 in order to share the force with the operator placed behind of the carriage 1 and to ensure his displacement.

As shown in FIG. 3, the front frame 13 comprises, like the rear frame 12, a hinge 4, so that the front frame 13 can be bent over the rest of the chassis 2 when we switch to the simple carrying configuration. This hinge 4 also allows removing the front frame 13 in order to be placed in a simplified configuration as shown in FIG. 2.

The chassis 2 comprises support bars 14 allowing to fasten the positioning bars 15. In the exemplary embodiment, the support bars 14 are disposed substantially horizontally while the positioning bars 15 allowing to receive the sensors 7 are disposed substantially vertically. In another embodiment, this arrangement could however be reversed and the positioning bars in this other embodiment would be disposed substantially horizontally.

Advantageously, so as to reduce the weight of the whole while ensuring a good rigidity, each frame 12, 13 is constituted of three non-metallic hollow tubes, one of the tubes constituting a holding bar.

It is important to note that in general, the elongate elements of the chassis 2, will also be advantageously made from hollow tubes and of non-metallic and in particular plastic material.

The chassis 2 comprises at least one positioning bar 15 equipped with housings 11 allowing to secure the sensors 7 along an axis substantially vertical with respect to the ground.

In the exemplary embodiment of FIGS. 1 to 3, the chassis 2 comprises five positioning bars 15 connected by support bars 14 as well as an axle 16.

In other embodiments, the chassis 2 may comprise only but two positioning bars 15, a support bar 14 and an axle 16.

As shown in the appended Figures, the positioning bars 15, allowing to secure the sensors 7, are disposed along at least two axes, so as to form a detection plane P substantially perpendicular to the direction of displacement of the carriage.

Advantageously, the positioning bars 15 are spaced of at least 0.4 m so as to space the sensors 7 and constitute a large detection area, thereby ensuring a better accuracy of the measurements.

For the same purpose of constituting an enlarged detection area, two lateral extensions 17 are provided at the chassis 2, allowing to increase the spacing between the sensors 7. The positioning of the sensors 7 on these extensions 17 allow increasing the detection area. These extensions thus include each a positioning bar 15 constituting the fourth and fifth positioning bars 15 of the carriage 1.

The lateral extensions 17 include fastening means 18 on the ends of the support bars 14. According to an advantageous embodiment, the fastening means 18 include sleeves placed on the horizontal tubes of the lateral extensions 17, said sleeves being inserted into the tubes of the support bars 14 placed opposite thereto. Other fastening modes of these lateral extensions 17, within the reach of those skilled in the art, are also possible.

Depending on the sensors used or on the required accuracy, a modular carriage 1 is advantageously provided including two to five positioning bars, each equipped with 1 to 5 sensors 7.

The modular carriage 1 as mentioned above ensures great freedom to the operators, in particular thanks to these different configurations and allows making accurate surveys regardless of the nature of the terrain on which it is transported.

Of course, other features of the invention could also have been considered without departing from the scope of the invention defined by the claims below. For example, in one variant, means for measuring the inclination of the chassis 2 relative to the horizontal or vertical plane are provided, allowing to correct the measurement of the sensors 7.

The invention claimed is:

1. A modular carriage configured to support a device for recording magnetic terrain data for non-invasive inspection of pipes or pipelines, the modular carriage comprising:
   a hinged chassis;
   a recording device receiving support structure configured to receive and to secure the device for recording the magnetic field terrain data;
   a rear frame allowing manipulation of the carriage by an operator; and
   at least two positioning bars equipped with housings for securing sensors according to a first and a second axis respectively, the sensors coupled to the device for recording the magnetic terrain data,
   wherein the positioning bars form a detection plane P substantially perpendicular to the direction of displacement of the carriage.

2. The modular carriage according to claim 1, wherein the chassis includes support bars allowing fastening the positioning bars.

3. The modular carriage according to claim 1, wherein the recording device receiving support structure includes housings positioned at determined points and configured to receive the sensors.

4. The modular carriage according to claim 3, wherein the housings have a tapping screw configured to fasten the sensors mounted on threaded bushings in the housings by screwing.

5. The modular carriage according to claim 1, further comprising two lateral extensions with fasteners on ends of said at least one positioning bar, the two lateral extensions positioned and configured to facilitate increasing spacing between the sensors.

6. The modular carriage according to claim 1, further comprising a front frame comprising a holding bar configured to facilitate moving the carriage by two operators.

7. The modular carriage according to claim 6, wherein the front and/or rear frame comprises a hinge configured to bend the front and/or rear frame on the rest of the chassis.

8. The modular carriage according to claim 1, wherein the chassis comprises a non-metallic material.

9. The modular carriage according to claim 1, wherein the positioning bars are each equipped with 1 to 5 sensors.

10. The modular carriage according to claim 2, wherein the chassis comprises a measurer of an inclination of the plane P relative to a horizontal or vertical plane allowing correction of the measurement of the sensors.

\* \* \* \* \*